(12) United States Patent
Laird et al.

(10) Patent No.: US 7,104,529 B2
(45) Date of Patent: Sep. 12, 2006

(54) METHOD AND APPARATUS FOR FACILITATING MORE UNIFORM VAPOR DISTRIBUTION IN MASS TRANSFER AND HEAT EXCHANGE COLUMNS

(75) Inventors: Dana G. Laird, Prescott, WI (US); Azardokht Hajiloo, Wilmette, IL (US); Dennis Schmude, Houston, TX (US)

(73) Assignee: Koch-Glitsch, LP, Wichita, KS (US)

( * ) Notice: Subject to any disclaimer, the term of this patent is extended or adjusted under 35 U.S.C. 154(b) by 23 days.

(21) Appl. No.: 10/988,381

(22) Filed: Nov. 12, 2004

(65) Prior Publication Data

US 2005/0146062 A1 Jul. 7, 2005

Related U.S. Application Data

(60) Provisional application No. 60/520,635, filed on Nov. 17, 2003.

(51) Int. Cl.
*B01F 3/04* (2006.01)
(52) U.S. Cl. .......................... 261/79.2; 261/96; 261/98
(58) Field of Classification Search ............... 261/79.2, 261/96, 97, 98, 102, 105, 109
See application file for complete search history.

(56) References Cited

U.S. PATENT DOCUMENTS 1,961,956 A * 6/1934 Bleibtreu et al. ............. 96/258
5,106,544 A 4/1992 Lee et al.
5,516,465 A * 5/1996 Yeoman ..................... 261/79.2
5,605,654 A 2/1997 Hsieh et al.
6,889,961 B1 * 5/2005 Laird et al. ................. 261/79.2
6,889,962 B1 * 5/2005 Laird et al. ................. 261/79.2
6,948,705 B1 * 9/2005 Lee et al. .................... 261/79.2

* cited by examiner

*Primary Examiner*—Scott Bushey
(74) *Attorney, Agent, or Firm*—Hovey Williams LLP

(57) ABSTRACT

A vapor horn device for use in an elongated, generally upright mass transfer and/or heat exchange column having an internal region comprises an elongated, generally arcuate wall arranged to be located within the internal region and disposed to extend around a longitudinal axis of the column. The arcuate wall includes an inlet area positioned for being contacted by a vapor or mixed phase stream entering the column and causing the stream to flow along an outer surface of the arcuate wall and generally around the axis. The device also includes a primary elongated vane extending outwardly from the outer surface of the arcuate wall. This primary vane has an inner end located adjacent the outer surface of the inner wall and an outer end disposed in spaced relationship relative to the outer surface of the wall. The vane is disposed at a tangential angle relative to the direction of flow of the stream such that the inner end of the vane is further downstream than the outer end thereof whereby any portion of the stream impinging on the primary vane is redirected toward the outer surface of the arcuate wall. The device also desirably includes one or more vanes that extend radially outwardly from the inner wall.

29 Claims, 4 Drawing Sheets

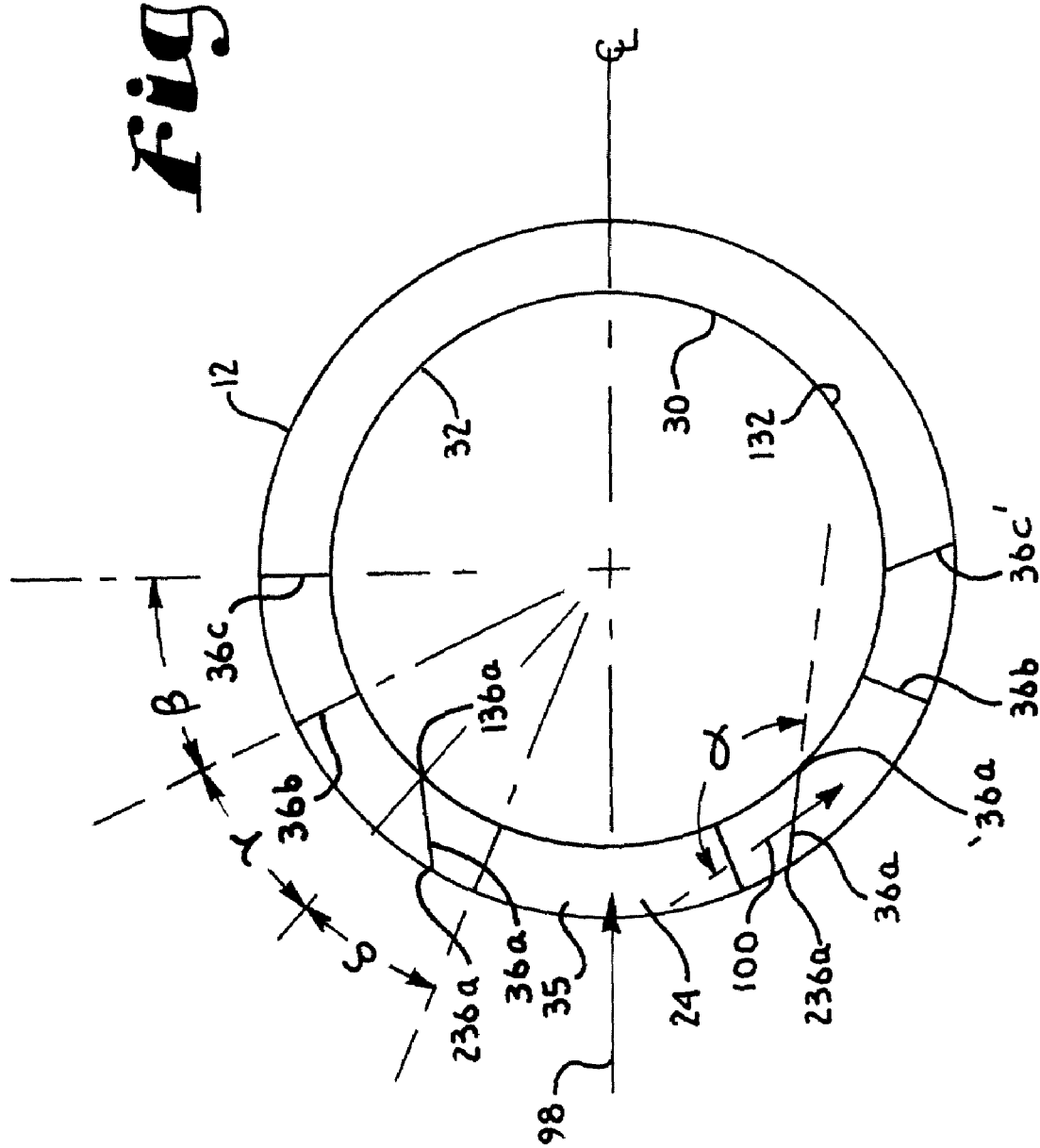

METHOD AND APPARATUS FOR FACILITATING MORE UNIFORM VAPOR DISTRIBUTION IN MASS TRANSFER AND HEAT EXCHANGE COLUMNS

CROSS-REFERENCE TO RELATED APPLICATION

Priority benefits under 35 U.S.C. §119(e) are claimed in this application from provisional application Ser. No. 60/520,635, filed on Nov. 17, 2003, the entirety of the disclosure of which is hereby specifically incorporated herein by this reference thereto.

BACKGROUND OF THE INVENTION

This invention relates in general to mass transfer and heat exchange columns and, more particularly, to methods and apparatus to improve vapor distribution in such columns.

In mass transfer and heat exchange columns, liquid and vapor streams are brought into contact with each other, normally in countercurrent flow, for mass or heat transfer, fractionation or other operations. Various types of internals, such as trays and random and structured packing, have been developed to facilitate interaction between the liquid and vapor streams within selected contact regions of the column. In order to increase the efficiency of the mass transfer or heat exchange taking place between the vapor and liquid within these contact regions, it is important that the liquid and vapor be uniformly distributed across the horizontal cross section of the column, particularly at the lower vapor-liquid interface where the vapor enters the packing or other contacting or internal device.

In columns of the types described above, vapor or mixed phase feed streams are frequently introduced radially or tangentially into the column through a feed nozzle at a location below the contact region. The vapor phase of the feed stream then rises through the contact region and interacts with downwardly flowing liquid. In certain specialized columns, the vapor or mixed phase feed stream is fed at high velocity through the feed nozzle into a flash zone located just above a section where the column transitions to a reduced diameter. The vapor then rises through overlying internals, such as trays, random packing, structured packing, grid packing, open spray chambers or side-to-side shower decks. Examples of such columns include, but are not limited to, virgin crude vacuum columns, virgin crude columns, FCCU main fractionator slurry pumparounds, visbreaker vacuum flashers, heavy oil vacuum towers, heavy oil fractionators, coker main fractionators, visbreaker fractionator, flexicoker main fractionators, and recovered lube oil vacuum towers.

Various devices have been developed in an attempt to interrupt the radial or tangential momentum of the feed stream entering columns of the types described above and redirect it so that it is able to rise in a more uniformly distributed manner across the cross section of the column as well as to separate the liquid components present in the feed stream from the vapor phase. An example of such a device is disclosed in U.S. Pat. No. 5,106,544 to Lee et al., where internal vanes are positioned within an annular vapor horn and are oriented to redirect the vapor or mixed phase feed stream downwardly through the open bottom of the vapor horn. The downwardly deflected vapor is then said to rise in a more uniform manner into an overlying packing bed. These internal vanes are also angled toward the external column shell in the direction of fluid flow so that the feed stream is deflected to impact against the inner surface of the column shell to facilitate separation of the liquid from the feed stream. As a result of computational fluid dynamics ("CFD") modeling, it has been discovered that the internal vanes, when angled toward the column shell in the direction of fluid flow, create a localized high velocity zone of upwardly flowing vapor in the center of the column. This high velocity zone is undesirable because the high velocity and horizontal maldistribution of vapor reduces the efficiency of the mass transfer or other processing occurring in the overlying zones. A need has thus developed for a way to further improve the distribution of the vapor across the column cross section.

SUMMARY OF THE INVENTION

In accordance with the concepts and principles of the invention, the same provides a vapor horn device for use in an elongated, generally upright mass transfer and/or heat exchange column having an internal region. In accordance with one preferred aspect of the invention, the device includes an elongated, generally arcuate wall arranged to be located within the internal region and the same is disposed to extend around a longitudinal axis of the column. The arcuate wall includes an inlet area positioned for being contacted by a vapor or mixed phase stream entering the column and causing the stream to flow along an outer surface of the arcuate wall and generally around the longitudinal axis of the column. The device also includes a primary elongated vane that extends outwardly from the outer surface of the arcuate wall and the same has an inner end located adjacent the outer surface of the wall and an outer end disposed in spaced relationship relative to the outer surface. This primary vane is thus desirably disposed at a tangential angle relative to the direction of flow of the vapor or mixed phase stream such that the inner end of the vane is further downstream than the outer end thereof whereby any portion of the stream impinging on the primary vane is redirected toward the outer surface of the arcuate wall.

Desirably, in accordance with one preferred aspect of the invention, the arcuate wall may be located for being contacted by a radially directed vapor or mixed phase stream. Alternatively, the arcuate wall may be located for being contacted by a tangentially directed vapor or mixed phase stream. In either case, the device may ideally include one or more radially extending elongated vanes which extends outwardly from the outer surface of said arcuate wall The device of the invention may also desirably include a secondary elongated vane that extends outwardly from the outer surface of the arcuate wall. Such secondary vane also has an inner end located adjacent the outer surface of the wall and an outer end disposed in spaced relationship relative to the outer surface of the wall. Such secondary vane is desirably disposed at a tangential angle relative to the direction of flow of the vapor or mixed phase stream such that the inner end of the secondary vane is further upstream than the outer end thereof. With this configuration, any portion of the stream impinging on the secondary vane is redirected away from the outer surface of the arcuate wall.

In further accordance with the concepts and principles of the invention, the secondary vanes and/or the radially extending vanes may be located downstream from the primary vane.

In a further aspect, the invention is directed to a column having a feed nozzle through which vapor or a mixed phase is fed at a high velocity into a feed zone within the column. The feed zone is preferably located above a portion of the column shell that tapers or transitions to a reduced diameter. In one example, the transitional portion of the column may be an elliptical head having a 2:1 ratio of the major horizontal radius to the height of the head. A feed device such as a vapor horn or vane inlet device is positioned within the column adjacent the feed nozzle to interrupt and redirect the momentum of the feed stream so that the vapor phase is able to rise in a more uniform manner into an overlying contact zone containing internals such as trays, random packing, structured packing, grid packing, open spray chambers or side-to-side shower decks. The feed device includes an at least partially open-bottomed, annular passageway in which a plurality of vertically-staggered internal vanes are positioned to redirect at least a portion of the feed stream downwardly through the bottom of the passageway toward the transitional portion of the column. The internal vanes extend inwardly from the column shell at one or more tangential angles that are selected to facilitate a more uniform horizontal distribution of the vapor as it rises through the open center of the feed device. At least one of the internal vanes is oriented to deflect the feed stream toward an inner annular wall of the feed device rather than toward the column shell. Preferably, at least one of the internal vanes is tangentially angled to deflect the feedstream toward the inner annular wall and at least one of the other internal vanes is radially oriented. One or more, but less than all, of the internal vanes may also be tangentially angled to deflect the feed stream toward the column shell. By varying the orientation of the internal vanes, it has been determined that a substantial reduction in the ascending vapor velocity and a corresponding improvement in horizontal vapor distribution are obtained.

In yet another aspect, the invention is directed to a method of distributing a vapor or mixed phase feed stream within a column having a feed zone located above a section of the column that transitions to a reduced diameter. The method includes the steps of directing the feed stream into a feed device having internal vanes extending inwardly at one or more tangential angles from the column shell toward an inner annular wall of the feed device, deflecting portions of the feed stream off of at least one of the internal vanes toward the inner annular wall, and discharging the deflected portions of the feed stream downwardly through an at least partially open bottom of the feed device. By deflecting the feed stream at selected, preferably differing tangential angles, the vapor is more uniformly distributed and has a more uniform velocity profile after it exits through the bottom of the feed device and then ascends through the open region centrally of the feed device into an overlying internal or other contacting device. At least one of the tangential angles is greater than 90° in the direction of flow of the feed stream so that portions of the feed stream are deflected toward an inner annular wall of the feed device rather than toward the column shell.

BRIEF DESCRIPTION OF THE DRAWINGS

FIG. 4 is a schematic top plan view of the feed device of FIG. 1 but with the top of the feed device removed for clarity and with one of the internal vanes oriented differently.

DESCRIPTION OF THE PREFERRED EMBODIMENTS

Figure 1:
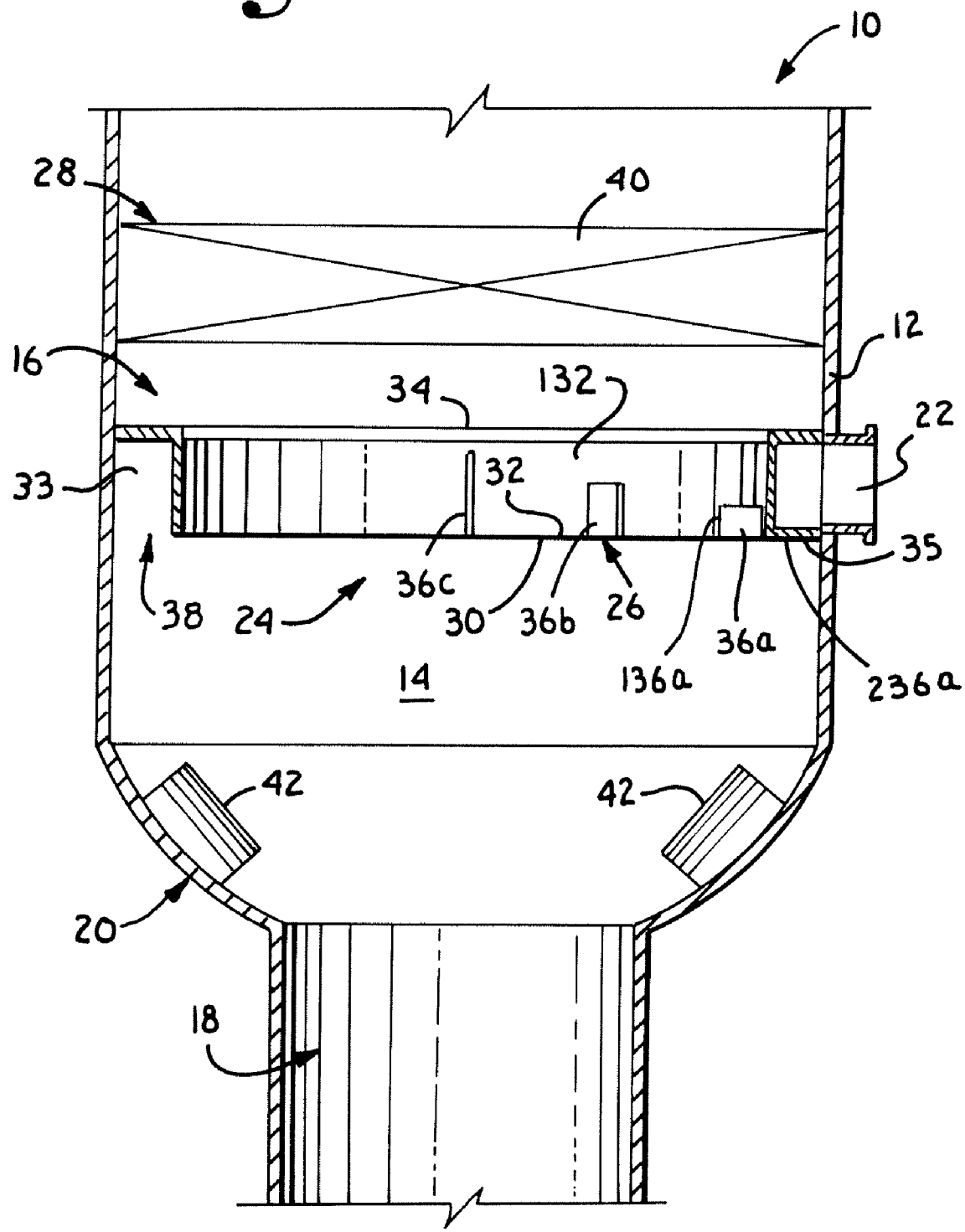
FIG. 1 is a fragmentary side elevation view of a portion of a mass transfer or exchange column which transitions from an upper region of a preselected diameter to a lower region having a reduced diameter, and illustrating a feed device constructed according to the present invention.
Figure 2:
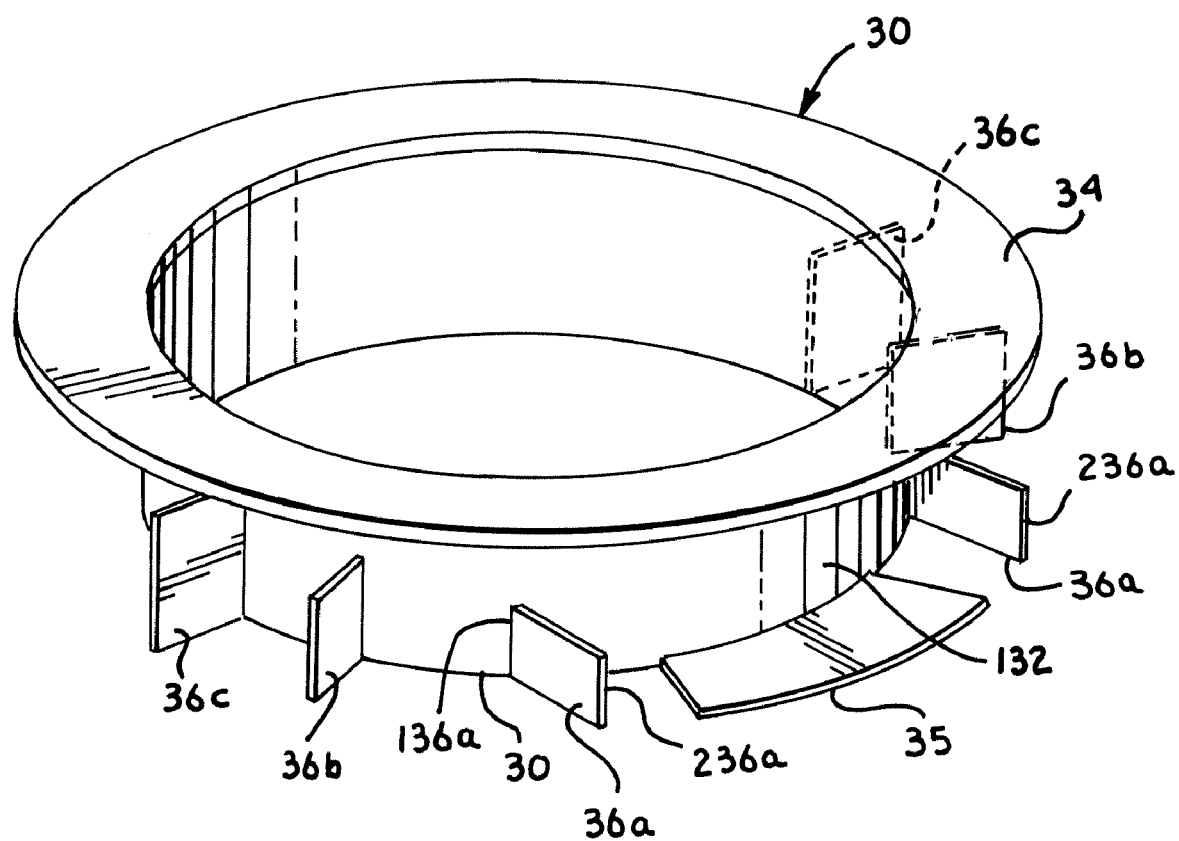
FIG. 2 is a top perspective view of the feed device of the present invention.

Referring now to the drawings in greater detail, and initially to FIGS. 1 and 2, a mass transfer or heat exchange column is designated generally by the numeral 10. Column 10 comprises an external shell 12 which defines an open internal region 14 and which has an upper region 16 of a preselected diameter, a lower region 18 of lesser diameter, and a transition region 20 positioned between the upper region 16 and lower region 18. The transition region 20 tapers from the diameter of the upper region 16 at the top to the diameter of the lower region 18 at the bottom. The primary function of the transition region 20 is to provide a transition between the larger diameter of the upper region 16 and the reduced diameter of the lower region 18. To achieve this function, the transition region 20 preferably is an elliptical head as illustrated in FIG. 1, or it may have planar or multi-segmented sides to form other shapes such as hemispherical or conical. An elliptical head having a 2:1 ratio of the major horizontal radius to the height of the head is one preferred configuration for the transition region 20.

The column 10 includes at least one vapor or mixed phase feed nozzle 22 that is located within the upper region 16, but may also partially extend into the transition region 20. The feed nozzle 22 delivers a high velocity vapor or mixed phase feed stream radially (in the direction of the arrow 98 in FIG. 4) into a feed zone 24 located within the upper region 16 of the column 10. Alternatively, the nozzle 22 may be oriented to deliver the vapor or mixed phase feed stream tangentially as shown in U.S. Pat. No. 5,106,544 mentioned above or at some intermediate orientation into the feed zone 24. It is to be noted in these latter regards, that the entirety of the disclosure of U.S. Pat. No. 5,106,544 is hereby specifically incorporated herein by this specific reference thereto.

More than one nozzle 22 may also be used if desired for particular applications. A feed device 26 is positioned at the outlet of the feed nozzle 22 to interrupt and redirect the momentum of the high speed feed stream so that the vapor phase is able to rise in a more uniform manner into an overlying contact zone 28. The feed device 26 preferably comprises a vapor horn 30 having an inner annular wall 32 spaced inwardly from the column shell 12 to form an annular flow passage 33 around at least a major portion of the periphery of the shell 12. The inner annular wall 32 is preferably placed at a constant distance from the shell 12 around its entire circumference. Alternatively, the inner annular wall 32 can be positioned gradually closer to the shell 12 in the direction of flow of the feed stream so that the radial width of the flow passage 33 gradually decreases in the direction of feed stream flow.

The vapor horn 30 includes a top 34 that extends horizontally between a top edge of the inner annular wall 32 and the column shell 12 to block upward passage of the feed stream traveling within the vapor horn 30. An optional floor 35 extends between a lower edge of the inner annular wall 32 and the column shell 12 in the region of the feed nozzle 22. The floor 35 extends along only a small portion of the circumference of the flow passage 33.

A plurality of internal vanes referred to in the drawings by the reference numerals 36a, 36b and 36c extend upwardly through an open bottom 38 of the vapor horn 30 into the feed stream flow passage 33. The internal vanes 36a, 36b and 36c are constructed to redirect the vapor or mixed phase feed stream in a downward direction and are positioned at gradually increasing heights in the direction of feed stream flow within the vapor horn 30. In one embodiment, the internal vanes 36a, 36b and 36c may desirably be planar. In another embodiment, an upper edge of the internal vanes 36a, 36b and 36c may be curved in a direction facing the flow of the feed stream, again as shown in U.S. Pat. No. 5,106,544. Other configurations for the internal vanes 36a, 36b and 36c are also possible and are within the scope of the invention. The internal vanes 36a, 36b and 36c preferably have a horizontal dimension sufficient to span the distance between the column shell 12 and the inner annular wall 32. If desired, however, one or more of the internal vanes 36a, 36b and 36c may be spaced from either the column shell 12 and/or the inner annular wall 32 so that a flow passage is formed between a vertical edge of the internal vane 36a, 36b and 36c and the shell 12 and/or wall 32.

In accordance with the present invention, the internal vanes 36a, 36b and 36c may desirably extend outwardly from an outer surface 132 of inner wall 32 at one or more tangential angles from the column shell 12, with at least one of the internal vanes (see the vanes 36a) angled toward the inner annular wall 32 to deflect the vapor toward the inner annular wall 32 rather than toward the column shell 12. That is to say, each vane 36a has an inner end 136a that is located adjacent surface 132 and an outer end 236a that is disposed in spaced relationship to surface 132. Thus, the vanes 36a are disposed at a tangential angle relative to the direction of flow of the feed stream (see arrow 100 in FIG. 4) with the inner end 136a thereof disposed further upstream relative to the feed stream flow than the outer end 236a thereof. Preferably, therefore, the internal vanes 36a are each angled toward the inner annular wall 32. Preferably, one or more of the internal vanes may be arranged so as to extend radially outwardly from surface 132 (see vanes 36b and 36c in FIGS. 1 and 2). In addition, one or more, but less than all, of the internal vanes (see vane 36c' in FIG. 4) may desirably be angled in the opposite direction from vanes 36a so that the feed stream is directed outwardly toward the column shell 12. In this latter regard it is to be noted that FIG. 4 shows a different orientation for the vane 36c' relative to the corresponding vane 36c of FIGS. 1 and 2. By varying the tangential orientation of the internal vanes 36a, 36b and 36c, it has been determined that a substantial reduction in the ascending vapor velocity and a corresponding improvement in horizontal vapor distribution are obtained.

Using CFD modeling of a column 10 having a 2:1 elliptical head for the transition region 20 and a radial feed nozzle 22, it has been determined that positioning the internal vanes 36a (which are those that are closest to the feed nozzle 22) at a tangential angle α (see FIG. 4) of 120 to 140°, and ideally 130°, in the direction of flow of the feed stream, and positioning the internal vanes 36b and 36c so as to extend radially (as shown in FIGS. 1 and 2) produces a more uniform vapor distribution and a more uniform velocity profile in a horizontal plane located six inches above the feed device 26 than was obtained by the conventional practice of angling each of the turning vanes 36 toward the column shell 12. In the preferred CFD model, opposite edges of the vapor horn floor 35 were positioned 22.5° from the centerline of the feed nozzle 22 and the internal vanes 36a, 36b and 36c were positioned in each flow direction at successive 22.5° spacings from the edge of the vapor horn floor 35. These angles are represented by the angles β, γ and δ in FIG. 4. The internal vane 36a in each flow direction extends upwardly into the passage 33 a vertical distance of 20 inches and the second and third internal vanes 36b and 36c extend upwardly 30 and 40 inches, respectively. Positioning the internal vanes 36a closer to the edge of the vapor horn floor 35 less than 22.5° provided an even more uniform vapor distribution and velocity profile, but greater spacing was believed necessary to permit efficient liquid deentrainment at the internal vanes 36a. It will be appreciated that other arrangements of internal vanes 36a, 36b and 36c also provide improved results provided that they are positioned at differing tangential angles with at least one of the internal vanes (36a) being angled toward the inner annular wall 32. By using a combination of tangential angles, the vapor is directed out of the feed device 26 in different directions rather than being focused toward the center of the column 10. As a result, a much more uniform velocity profile can be obtained.

The method of the present invention includes the steps of directing the feed stream into the feed device 26 described above, deflecting portions of the feed stream off of at least one of the internal vanes (36a) toward the inner annular wall 32, and discharging the deflected portions of the feed stream downwardly through the at least partially open bottom 38 of the feed device 26. By deflecting the feed stream at selected, preferably differing tangential angles, the vapor is more uniformly distributed and has a more uniform velocity profile after it exits through the bottom 38 of the feed device 26 and then ascends through the open region centrally of the feed device 26 into the overlying internal or other contacting device in the contact zone 28. At least one of the tangential angles is greater than 90° in the direction of flow of the feed stream so that portions of the feed stream are deflected toward an inner annular wall 32 of the feed device 26 rather than toward the column shell 12.

Numerous modifications can be made to the vapor horn 30, such as those described in U.S. Pat. No. 5,605,654, which is incorporated herein by reference in its entirety. Alternatively, other types of feed devices 26 known in the prior art can be used.

Various internals 40, such as trays, random packing, structured packing, grid packing, open spray chambers and/or side-to-side shower decks, are located in the contact zone 28. For example, when the column 10 is a crude vacuum column, the internals 40 will comprise part of a wash zone that is designed to remove entrained residual components from a flash zone vapor stream. The wash zone internals 40 will typically comprise contacting devices, such as trays or packings, and spray nozzles or headers that deliver wash oil to the contacting devices. Other combinations and arrangements of internals 40 are possible and are within the scope of the invention.

The transition region 20 includes at least one and preferably a plurality of baffles 42 that are constructed and positioned to prevent or reduce the swirling motion that can be imparted to the high velocity vapor or mixed phase feed stream as it is deflected downwardly into the transition region 20 by the feed device 26. The baffles 42 may abut the column shell 12 or they may be spaced therefrom to allow a portion of the feed stream to pass between the baffle 42 and shell 12. The baffles 42 may be planar or curved and may extend along only a portion or the entire longitudinal length of the transition region 20. The baffles 42 may each be of the same construction, or baffles 42 in one portion of the transition region 20 may be constructed or oriented differently than baffles in other portions of the transition region 20. The objective of the baffles 42 is to prevent or disrupt some or all of the swirling motion of the feed stream in the transition region 20 to achieve a uniform vapor stream flow pattern with only vertical velocity components. In addition, the baffles 42 reduce the vapor maldistribution that can result as the swirling vapor rises upwardly through the feed zone 24 into the overlying internals 40. It will be appreciated that many modifications can be made to the baffles 42 to achieve these objectives. In addition, the invention is generally directed to various types of columns 10 that employ a transition region 20 and a high velocity vapor or mixed phase feed, such as virgin crude columns, FCCU main fractionator slurry pumparounds, visbreaker vacuum flashers, heavy oil vacuum towers, heavy oil fractionators, coker main fractionators, visbreaker fractionator, flexicoker main fractionators, and recovered lube oil vacuum towers.

Figure 3:
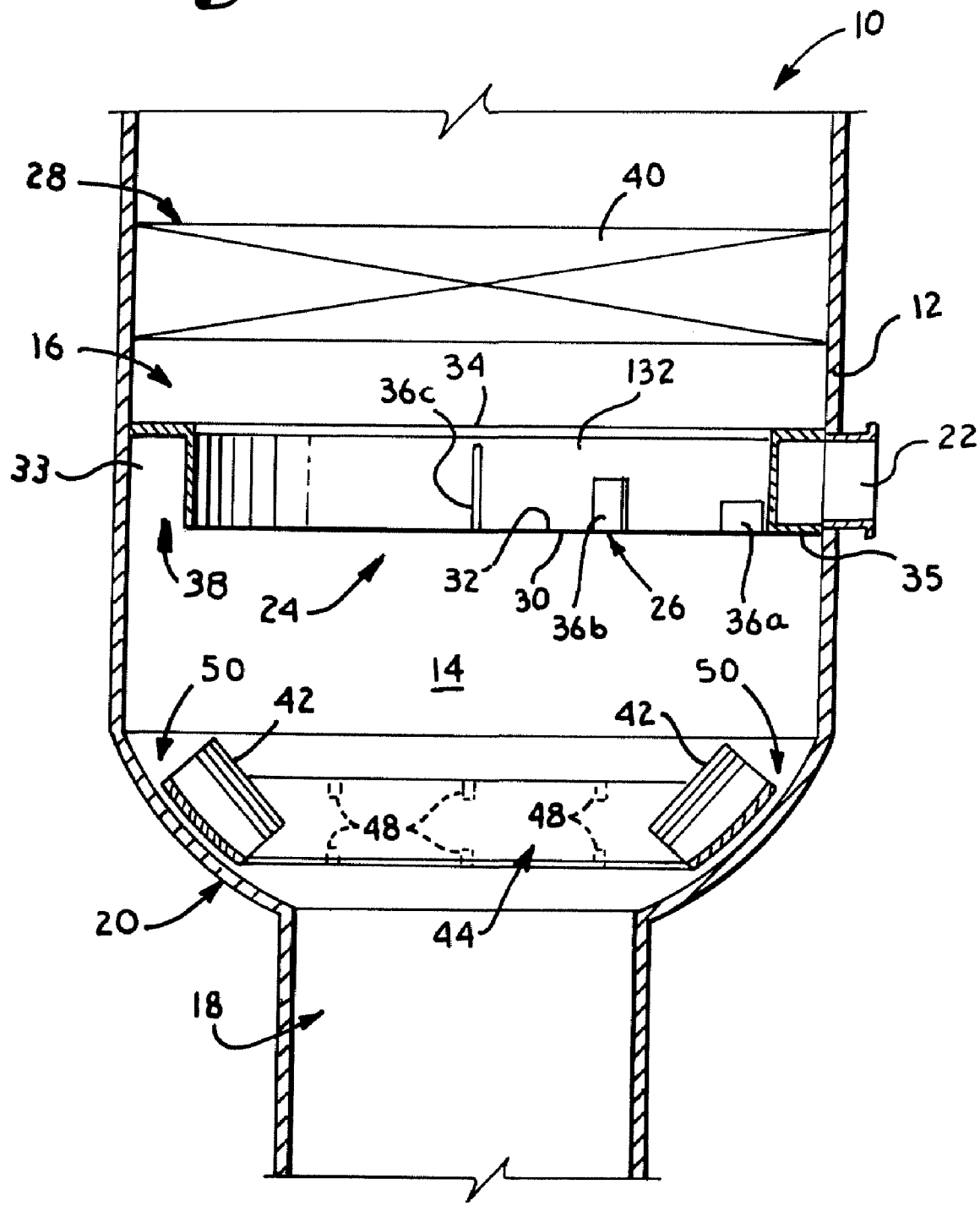
FIG. 3 is a fragmentary side elevation view of the mass transfer column similar to the view shown in FIG. 1 but illustrating a liquid shield in the form of an annular wall positioned in a transition region of the column.

In an alternate embodiment shown in FIG. 3, the column 10 can include a shield 44 positioned in the transition region 20 to shelter liquid flowing downwardly along the inner face of the column shell 12 from the swirling feed stream that can cause unwanted reentrainment of the liquid. The shield 44 can take many forms and as illustrated is a wall 46 that is spaced inwardly from the transition region 20 of the column shell 12. Appropriate mounts 48 are used to secure the wall 46 to the shell 12. The spacing between the shell 12 and the wall 46 forms an annulus 50 that provides a passageway for liquid to flow downwardly through the transition region 20 while being shielded from the swirling feed stream. The shield 44 thus reduces the amount of liquid that is entrained by the vapor. Baffles 42 are preferably used in conjunction with the shield 44, and they can be mounted to an inner face of the wall 46.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

We claim:

1. A feed device for interrupting and redirecting the momentum of a vapor or mixed phase feed stream entering an elongated, generally upright mass transfer and/or heat exchange column, said device comprising:
    an elongated, generally arcuate wall arranged to be located within an internal region of said column, said arcuate wall being disposed to extend around a longitudinal axis of said column and including an inlet area positioned for being contacted by said stream and causing said stream to flow along an outer surface of said arcuate wall and generally around said axis; and
    a plurality of spaced apart, elongated vanes extending outwardly from said outer surface of the arcuate wall, said vanes being vertically staggered at increasing heights in the direction of flow of said stream around said axis,
    wherein one of said vanes comprises a primary vane having an inner end located adjacent said outer surface and an outer end disposed in spaced relationship relative to said outer surface, said primary vane being disposed at a tangential angle relative to the direction of flow of said stream such that the inner end of the primary vane is further downstream than the outer end thereof whereby any portion of the stream impinging on the primary vane is redirected toward said outer surface of the arcuate wall, said tangential angle of said primary vane being different than a tangential angle of another one of said vanes.

2. A feed device as set forth in claim 1, wherein said arcuate wall is located for being contacted by a radially directed vapor or mixed phase stream.

3. A feed device as set forth in claim 1, wherein said arcuate wall is located for being contacted by a tangentially directed vapor or mixed phase stream.

4. A feed device as set forth in claim 1, wherein one of said vanes comprises a secondary vane extending outwardly from said outer surface of the arcuate wall and having an inner end located adjacent said outer surface and an outer end disposed in spaced relationship relative to said outer surface, said secondary vane being disposed at a tangential angle relative to the direction of flow of said stream such that the inner end of the secondary vane is further upstream than the outer end thereof whereby any portion of the stream impinging on the secondary vane is redirected away from said outer surface of the arcuate wall.

5. A feed device as set forth in claim 1, wherein one of said vanes comprises a radially extending vane which extends outwardly from the outer surface of said arcuate wall.

6. A feed device as set forth in claim 4, wherein one of said vanes comprises a radially extending vane which extends outwardly from the outer surface of said arcuate wall.

7. A feed device as set forth in claim 4, wherein said secondary vane is located downstream from said primary vane and said primary vane is located closer to said inlet area than any of the remaining ones of said vanes.

8. A feed device as set forth in claim 5, wherein said radially extending vane is located downstream from said primary vane.

9. A feed device as set forth in claim 6, wherein said radially extending vane and said secondary vane are each located downstream from said primary vane.

10. A feed device as set forth in claim 1, wherein said arcuate wall is annular.

11. A feed device as set forth in claim 1, comprising a vapor horn device.

12. A mass transfer column comprising:
    an external shell that defines an open internal region within the shell and comprises an upper region of a preselected diameter, a lower region of a reduced diameter, and a transition region positioned between the upper and lower regions and having a diameter that transitions from said preselected diameter to said reduced diameter;
    a feed nozzle positioned at least partially within said upper region of the shell for introducing a vapor or mixed phase feed stream within said open internal region of the shell; and
    a feed device within said open internal region and positioned to redirect the vapor or mixed phase feed stream when introduced through said feed nozzle, said feed device comprising an inner annular wall spaced inwardly from the shell and forming an annular flow passage for the flow of said feed stream within said feed device, a top extending between said inner annular wall and said shell, and a plurality of spaced apart, internal vanes extending outwardly in a space between said inner annular wall and said shell, said vanes being vertically staggered at increasing heights in the direction of flow of said feed stream along said annular passage within said feed device, at least one of said internal vanes comprising a primary vane that is tangentially angled relative to the direction of flow of said feed stream along said annular passage within said feed device to direct the feed stream toward said inner annular wall, said tangential angle of said primary vane being different than a tangential angle of another one of said vanes.

13. A mass transfer column as set forth in claim 12, wherein one of said vanes comprises a secondary vane extending outwardly from an outer surface of the inner annular wall and having an inner end located adjacent said outer surface and an outer end disposed in spaced relationship relative to said outer surface, said secondary vane being disposed at a tangential angle relative to the direction of flow of said feed stream along said annular passage within said feed device such that the inner end of the secondary vane is further upstream than the outer end thereof whereby any portion of the feed stream impinging on the secondary vane is redirected away from said outer surface of the inner annular wall.

14. A mass transfer column as set forth in claim 12, wherein one of said vanes comprises a radially extending vane which extends outwardly from an outer surface of said inner annular wall.

15. A mass transfer column as set forth in claim 13, wherein one of said vanes comprises a radially extending vane which extends outwardly from the outer surface of said inner annular wall.

16. A mass transfer column as set forth in claim 13, wherein said secondary vane is located downstream from said primary vane and said primary vane is located closer to said feed nozzle than any of the remaining ones of said vanes.

17. A mass transfer column as set forth in claim 14, wherein said radially extending vane is located downstream from said primary vane.

18. A mass transfer column as set forth in claim 12, wherein said primary vane extends at a tangential angle of between 120 to 140° to the direction of flow of said feed stream along said annular passage within said feed device.

19. A mass transfer column as set forth in claim 12, wherein said primary vane extends at a tangential angle of 130° to the direction of flow of said feed stream along said annular passage within said feed device.

20. A mass transfer column as set forth in claim 12, wherein said inner annular wall is spaced a constant distance from said shell.

21. A mass transfer column as set forth in claim 12, wherein said inner annular wall is spaced gradually closer to said shell in said direction of flow of said feed stream along said annular passage within the feed device.

22. A mass transfer column as set forth in claim 12, wherein said vanes extend between said inner annular wall and said shell.

23. A mass transfer column as set forth in claim 12, wherein said vanes are planar.

24. A mass transfer column as set forth in claim 12, wherein said vanes have an upper edge curved in a direction facing the flow of said feed stream along said annular passage within said feed device.

25. A feed device as set forth in claim 1, wherein said vanes are planar.

26. A feed device as set forth in claim 1, wherein said vanes have an upper edge curved in a direction facing the flow of said stream.

27. A feed device as set forth in claim 1, wherein said primary vane extends at a tangential angle of between 120 to 140° to the direction of flow of said stream.

28. A feed device as set forth in claim 1, wherein said primary vane extends at a tangential angle of 130° to the direction of flow of said stream.

29. A mass transfer column comprising:

an external shell that defines an open internal region within the shell and comprises an upper region of a preselected diameter, a lower region of a reduced diameter, and a transition region positioned between the upper and lower regions and having a diameter that transitions from said preselected diameter to said reduced diameter;

a feed nozzle positioned at least partially within said upper region of the shell for introducing a vapor or mixed phase feed stream within said open internal region of the shell; and a feed device within said open internal region and positioned to redirect the vapor or mixed phase feed stream when introduced through said feed nozzle, said feed device comprising an inner annular wall spaced inwardly from the shell and forming an annular flow passage for the flow of said feed stream within said feed device, a top extending between said inner annular wall and said shell, a floor extending between a lower edge of said inner annular wall and said shell and extending circumferentially from under said feed nozzle along only a portion of a circumference of said inner annular wall, and a plurality of spaced apart, internal vanes extending between said inner annular wall and said shell, said vanes being vertically staggered at increasing heights in the direction of flow of said feed stream along said annular passage within said feed device, wherein at least one of said internal vanes comprises a primary vane that is positioned at a tangential angle of between 120 to 140° relative to the direction of flow of said feed stream along said annular passage within said feed device to direct the feed stream toward said inner annular wall, wherein another one of said vanes comprises a secondary vane extending outwardly from an outer surface of the inner annular wall and having an inner end located adjacent said outer surface and an outer end disposed in spaced relationship relative to said outer surface, said secondary vane being disposed at a tangential angle relative to the direction of flow of said feed stream along said annular passage within said feed device such that the inner end of the secondary vane is further upstream than the outer end thereof whereby any portion of the feed stream impinging on the secondary vane is redirected away from said outer surface of the inner annular wall.

* * * * *